United States Patent
Veldkamp et al.

(10) Patent No.: US 7,520,802 B1
(45) Date of Patent: Apr. 21, 2009

(54) CONVEYOR SYSTEM WITH MOVEABLE DROP POINT

(75) Inventors: Brent M. Veldkamp, Cumming, IA (US); David W. Alexander, Boone, IA (US); Kenneth B. Arnote, Albion, IA (US); Kenneth L. Lebsack, Ankeny, IA (US)

(73) Assignee: Stork Townsend Inc., Des Moines, IA (US)

( * ) Notice: Subject to any disclaimer, the term of this patent is extended or adjusted under 35 U.S.C. 154(b) by 0 days.

(21) Appl. No.: 12/028,320

(22) Filed: Feb. 8, 2008

(51) Int. Cl.
  *A22C 11/00* (2006.01)
(52) U.S. Cl. ........................................... 452/51
(58) Field of Classification Search ............. 452/21–27, 452/30–37, 46–48, 51
  See application file for complete search history.

(56) References Cited

U.S. PATENT DOCUMENTS

| | | | |
|---|---|---|---|
| 4,547,931 A | 10/1985 | Staudenrausch et al. | |
| 4,644,607 A | 2/1987 | Sziede | |
| 4,682,385 A | 7/1987 | Kasai et al. | |
| 4,761,854 A | 8/1988 | Schnell et al. | |
| 4,880,105 A | 11/1989 | Kasai et al. | |
| 5,372,537 A | 12/1994 | Stiles | |
| 6,855,047 B2 * | 2/2005 | Shefet et al. | 452/32 |
| 6,866,573 B2 | 3/2005 | Shefet et al. | |
| 6,869,353 B2 | 3/2005 | Kasai | |
| 7,070,492 B2 * | 7/2006 | Shefet et al. | 452/32 |
| 7,074,120 B2 * | 7/2006 | Shefet et al. | 452/32 |
| 7,160,184 B1 | 1/2007 | Lebsack et al. | |
| 2005/0239386 A1 | 10/2005 | Nakamura et al. | |

\* cited by examiner

*Primary Examiner*—Thomas Price

(57) ABSTRACT

A conveyor system for transporting a strand of sausage having a carriage slidably mounted to an operating platform where the carriage has an end turn sprocket where the strand is dropped onto a smoke stick and the carriage moves to drop the strand along the length of the smoke stick.

9 Claims, 1 Drawing Sheet

CONVEYOR SYSTEM WITH MOVEABLE DROP POINT

BACKGROUND OF THE INVENTION

The present invention is directed toward a conveyor system for transporting sausage loops to a smoke stick for further processing. More specifically, the invention is directed toward a conveyor system having a moveable drop point.

Conveyor systems for transporting sausage loops are known in the art. When making linked sausages, it is usually necessary to loop the sausage casings onto smoke sticks. Typically, the casings are automatically looped onto hooks attached to a conveyor chain that transports the loops away from the loading point and toward an unloading point. A smoke stick is placed within the loops and lifted away from the hooks causing the loops to transfer from the hooks to the smoke stick. This transfer is done either manually or automatically.

In placing the loops on the smoke stick, the loops should be placed far enough apart so that the sausages do not touch, which permits uniform cooking, yet still close enough together to maximize the number of loops on a smoke stick for efficient use of the oven space. Also, the casings must be looped so that an entire casing fits onto a single smoke stick. Presently, the spacing of the loops is primarily dependent on the diameter of the sausage. To adjust the spacing, conveyors are available with different hook spacings for different sizes of sausage. As the size of the sausage is changed, the hook spacings must also be changed which is difficult and time consuming. In addition, with present conveyors time is required to remove a filled smoke stick and position an empty smoke stick for further processing. The time needed to remove and replace the smoke stick slows the sausage production and requires additional time to fill the oven. Therefore, there exists a need in the art for a conveyor system that addresses these deficiencies.

An objective of the present invention is to provide a conveyor system with a moveable drop point.

Another objective of the present invention is to provide a conveyor system where the spacing between loops placed on a smoke stick is easily adjusted.

A still further objective of the present invention is to provide a conveyor system that reduces the amount of time of removal and replacement of the smoke stick.

These and other objectives will be apparent to one skilled in the art based on the drawings, written description, and claims.

BRIEF SUMMARY OF THE INVENTION

A conveyor system/assembly having an operating platform supported by a frame. A moveable carriage is slidably mounted within an opening of the operating platform. The carriage has a sprocket/pulley and an end turn or drop point sprocket/pulley mounted thereto. Also, mounted to the operating platform is a plurality of tension sprockets/pulleys. A continuous conveyor chain having a plurality of hooks secured to the chain is mounted about the sprockets/pulleys. The hooks receive an elongated strand of sausage at a loading station and transports the strand to a drop point or unload station. Once the strand reaches the unload station the carriage moves toward the load station which in turn moves the end turn sprocket/pulley toward the loading station. As the end turn sprocket/pulley moves toward the loading station, the sausage strand is unloaded onto the adjacent smoke stick. Once the smoke stick is loaded, the carriage returns to the start position.

DETAILED DESCRIPTION OF THE PREFERRED EMBODIMENT

Figure 1:
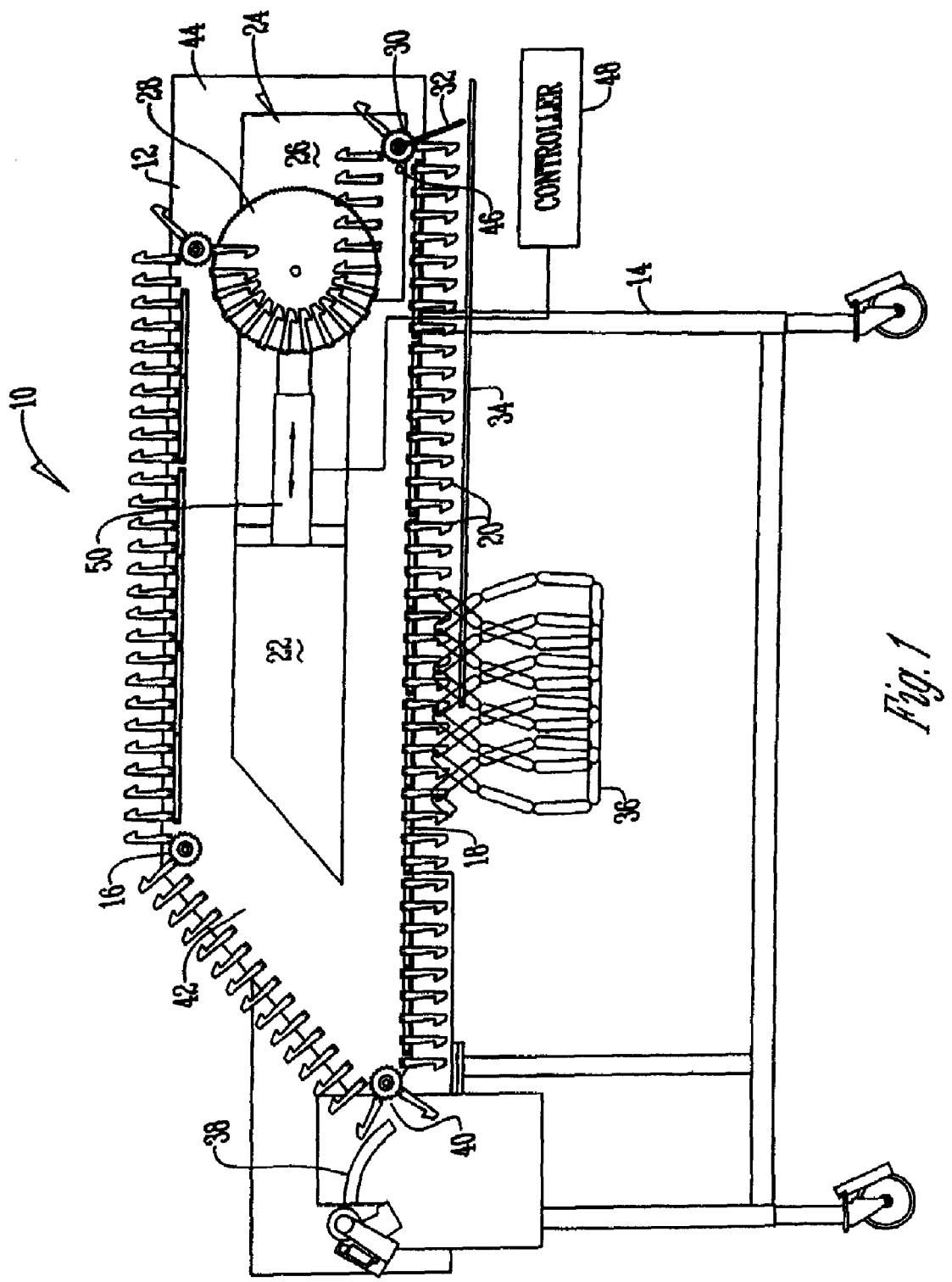
FIG. 1 is a side view of a conveyor assembly.

The conveyor assembly 10 has an operating platform 12 supported by a frame 14. The operating platform 12 typically is positioned in a vertical plane, but may also be supported by the frame 14 in a horizontal plane. A plurality of rotational members 16 such as sprockets, pulleys, and the like are attached to the platform 12 adjacent the outer perimeter of the platform 12. A continuous conveying chain or belt 18 is mounted to sprockets 16. A plurality of hooks 20 are secured to the chain 18 in any conventional manner. One of the sprockets 16, typically at the loading point 40 is driven by an electric motor to move chain 18 and hooks 20 past the loading point 40. Slidably mounted in opening 22 of the platform 12 is carriage 24. Carriage 24 has a plate 26 upon which a first sprocket 28 is rotatably mounted. A second end turn or (drop point) sprocket 30 is also mounted to plate 26. In one embodiment, a wiper 32 is mounted to the drop point sprocket 30 or alternatively to plate 26. Removably positioned near the operating platform 12 is a smoke stick 34.

In operation an elongated strand 36 of linked sausage is delivered through a conventional horn 38 of a sausage encasing and linking machine whereupon the strand 36 flows into the path of the hooks 20 which are moving past the looping point or loading station 40 at end 42 of the platform 12.

After the strand 36 has been loaded on hook 20 the chain 18 transports the strand 36 from end 42 toward end 44. When the strand 36 reaches the drop point sprocket 30 the strand 36 will drop through gravity and/or through engagement with wiper 32 onto the smoke stick 34.

When the strand 36 reaches the drop point sprocket 30 a sensor 46 mounted to platform 12 recognize the presence of the strand 36 and sends a signal to controller 48. Alternatively, the sensor 46 is mounted to plate 26. The controller 48 processes the signal and activates an actuator 50 or other mechanical, electromechanical or hydraulic device that is connected to the carriage 24. Once activated, the actuator 50 moves the carriage 24 from end 44 toward end 42 along opening 22 of the operating platform 12 at a predetermined rate. The rate at which the actuator 50 moves the carriage is based upon the drive speed of chain 18 and the desired spacing on the smoke stick, which is input into the controller 48. As the carriage 24 moves from end 44 toward end 42 the drop point moves along the length of the smoke stick 34 creating the desired spacing on the smoke stick 34. Alternatively, sprocket 28 is powered in any convenient manner such as by an electric motor (not shown) to move the chain 18 about sprockets 16, 28, and 30. A predetermined difference in the relative speeds of the chain 18 at the loading point 40 and drop point 30 will cause the carriage 24 to move within the platform 12.

Once the drop point reaches the end of the smoke stick 34, and the smoke stick 34 is filled with sausage loops, the controller 48 activates the actuator 50 to return the carriage 24 to its start position at end 44. As the carriage 24 is returned to the start position the filled smoke stick 34 is removed and replaced with an empty smoke stick 34. As this occurs, there is no interruption in the delivery of linked sausage to the hooks 20 at the looping point 40.

Thus, a carriage assembly has been shown that at the very least meets all the stated objective.

What is claimed is:

1. A conveyor assembly for linked sausage strands, comprising:
    an operating platform supported by a frame;
    a carriage slidably mounted to the operating platform and having a plate;
    at least one rotation member mounted to the operating platform;
    a continuous conveying chain mounted to the rotational member; and
    a plurality of hooks secured to the chain; and
    a drop point sprocket mounted to the plate of the carriage so that movement of the carriage moves the drop point sprocket along a length of a smoke stack.

2. The conveyor assembly of claim 1 wherein an actuator is operatively connected to the carriage.

3. The conveyor assembly of claim 1 wherein a sensor is mounted to the platform.

4. The conveyor assembly of claim 1 wherein a sensor is mounted to the carriage.

5. A method of loading linked sausage strands on a smoke stick; comprising the steps of:
    delivering a strand of linked sausage to a plurality of hooks mounted to a conveyor assembly at a loading station;
    transporting the strand of linked sausage from the loading station to an unloading station;
    unloading the strand of linked sausage onto a smoke stick; and
    moving the unloading station while unloading the strand along the length of the smoke stick toward the loading station.

6. The method of claim 5 further comprising the steps of sensing the strand at the unloading station and signaling the controller.

7. The method of claim 5 wherein the unload station is moved at a predetermined rate.

8. The method of claim 7 wherein the predetermined rate is based on a drive speed rate of a chain of the conveyor assembly used to transport the strand of linked sausages to create a desired spacing of the strand onto the smoke stick.

9. The method of claim 5 further comprising the step of loading the strand onto the plurality of hooks as the unloading station is moved away from the loading station.

* * * * *

UNITED STATES PATENT AND TRADEMARK OFFICE
CERTIFICATE OF CORRECTION

PATENT NO. : 7,520,802 B1  Page 1 of 1
APPLICATION NO. : 12/028320
DATED : April 21, 2009
INVENTOR(S) : Brent M Veldkamp et al.

It is certified that error appears in the above-identified patent and that said Letters Patent is hereby corrected as shown below:

Column 3, line 18 delete "stack" and insert --stick--

Signed and Sealed this

Eighth Day of December, 2009

David J. Kappos
*Director of the United States Patent and Trademark Office*